United States Patent

Wu et al.

(10) Patent No.: US 10,230,221 B2
(45) Date of Patent: Mar. 12, 2019

(54) SPOUT FOR SWITCHGEAR, SWITCHGEAR HAVING SPOUT, AND METHOD THEREOF

(71) Applicant: ABB Schweiz AG, Baden (CH)

(72) Inventors: Hao Wu, Shanghai (CN); Liying Li, Shanghai (CN); He Meng, Shanghai (CN); Xuhui Ren, Shanghai (CN); Rui Xing, Shanghai (CN); Fangwei Zheng, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/485,484

(22) Filed: Apr. 12, 2017

(65) Prior Publication Data

US 2017/0222408 A1 Aug. 3, 2017

Related U.S. Application Data

(62) Division of application No. 14/294,382, filed on Jun. 3, 2014, now Pat. No. 9,685,768.

(30) Foreign Application Priority Data

Jun. 13, 2013 (CN) .......................... 2013 1 0232772

(51) Int. Cl.
*H02B 1/56* (2006.01)
*H02B 13/00* (2006.01)
(Continued)

(52) U.S. Cl.
CPC ............ *H02B 13/005* (2013.01); *H01R 4/70* (2013.01); *H01R 13/10* (2013.01); *H02B 1/20* (2013.01);
(Continued)

(58) Field of Classification Search
None
See application file for complete search history.

(56) References Cited

U.S. PATENT DOCUMENTS 2,824,939 A * 2/1958 Claybourn ............... H02B 1/56
174/16.1
3,338,768 A * 8/1967 Martin .................. H01B 17/525
156/293
(Continued)

FOREIGN PATENT DOCUMENTS

| CN | 201219070 Y | 4/2009 |
| CN | 201365069 Y | 12/2009 |
| CN | 202308841 U | 7/2012 |

OTHER PUBLICATIONS

Unofficial translation of CN Office Action and Search Report issued in connection with corresponding CN Application No. 201310232772.3 dated Mar. 22, 2017.

*Primary Examiner* — Courtney Smith
(74) *Attorney, Agent, or Firm* — Barnes & Thornburg LLP

(57) ABSTRACT

A spout for a connection between a bus bar and a circuit breaker in switchgear includes a housing and a fixed contact. The housing is formed of insulative material and includes a tubular body having an inner cavity and a radial first ventilation opening, a base portion having a first longitudinal opening, and a fixed contact receiving portion having a second longitudinal opening. The fixed contact is formed of a conductive material, has an outer contact surface exposed through the second longitudinal opening, and forms a portion of an outer surface of the spout. A switchgear includes a wall dividing a circuit breaker compartment from a bus bar compartment, and the base portion of the spout is securable to the wall.

29 Claims, 3 Drawing Sheets

(51) Int. Cl.
  *H02B 11/04*  (2006.01)
  *H01R 4/70*  (2006.01)
  *H01R 13/10*  (2006.01)
  *H02B 1/20*  (2006.01)
  *H02G 3/22*  (2006.01)
  *H02B 1/21*  (2006.01)

(52) U.S. Cl.
  CPC ............... *H02B 1/56* (2013.01); *H02B 11/04* (2013.01); *H02G 3/22* (2013.01); *H02B 1/21* (2013.01)

(56) References Cited

U.S. PATENT DOCUMENTS

| | | | | |
|---|---|---|---|---|
| 3,793,562 | A * | 2/1974 | Cleaveland | H02B 11/167 174/152 R |
| 4,992,906 | A * | 2/1991 | Doone | H01C 7/12 361/117 |
| 5,929,410 | A * | 7/1999 | Mun | H01H 1/62 200/258 |
| 6,504,382 | B2 * | 1/2003 | Smith | G01R 15/16 324/509 |
| 2002/0079906 | A1 * | 6/2002 | Rashkes | G01R 15/14 324/544 |
| 2007/0264856 | A1 * | 11/2007 | Erk | H01H 1/5822 439/291 |
| 2008/0053810 | A1 * | 3/2008 | Hering | H01H 1/5822 200/540 |
| 2012/0127636 | A1 * | 5/2012 | Abrahamsen | H02B 11/24 361/617 |
| 2013/0056341 | A1 * | 3/2013 | Binnendijk | H01H 1/40 200/547 |
| 2014/0185193 | A1 * | 7/2014 | Smith | H02B 11/04 361/620 |

\* cited by examiner

SPOUT FOR SWITCHGEAR, SWITCHGEAR HAVING SPOUT, AND METHOD THEREOF

CROSS-REFERENCE TO RELATED APPLICATIONS

This application is a divisional of U.S. patent application Ser. No. 14/294,382, filed on Jun. 3, 2014, which claims foreign priority benefits to Chinese Application No. 201310232772.3, filed on Jun. 13, 2013, all of which are incorporated by reference herein in their entireties.

BACKGROUND OF THE INVENTION

The subject matter disclosed herein relates to switchgear, and more particularly relates to a spout configured to support a connection between different compartments of the switchgear.

Switchgear, such as medium voltage ("MV") switchgear, includes various components secured within an enclosed structure. The switchgear is divided into compartments, such as a circuit breaker compartment housing one or more circuit breakers, a bus bar compartment housing a bus bar system, and a cable connection compartment housing a current transformer. The circuit breakers in the circuit breaker compartment can be electrically connected to the bus bar system in the bus bar compartment via spouts. The spouts provide an insulator/bushing system enabling the connections of the circuit breaker to be plugged into the bus system.

Spouts can be mounted onto a wall of the switchgear that separates the circuit breaker compartment from the bus bar compartment and cable connection compartment. Spouts include an insulative body having a longitudinal recess. Bolted within an interior of the longitudinal recess is a fixed contact for axially receiving the circuit breaker connection. A bus bar, such as a copper bar, is passed within a radial opening in the body. The bus bar makes contact with the fixed contact within an interior of the spout, thus providing electrical contact between the circuit breaker connection and the bus bar when the circuit breaker is plugged within the spout.

BRIEF DESCRIPTION OF THE INVENTION

According to one aspect of the invention, a spout for a connection between a bus bar and a circuit breaker in switchgear has an outer surface and includes a housing and a fixed contact. The housing is formed of insulative material and includes a tubular body having an inner cavity and a radial first ventilation opening, a base portion having a first longitudinal opening, and a fixed contact receiving portion having a second longitudinal opening. The fixed contact is formed of a conductive material and has an outer contact surface exposed through the second longitudinal opening. The fixed contact is configured to form a portion of the outer surface of the spout.

According to another aspect of the invention, a switchgear includes a wall dividing a circuit breaker compartment from a bus bar compartment, the wall including an aperture, and a spout having an outer surface and including a housing formed of insulative material, the housing including a tubular body having an inner cavity and a radially arranged first ventilation opening, a base portion secured to the wall and having a first longitudinal opening, and a fixed contact receiving portion having a second longitudinal opening, the spout further including a fixed contact formed of a conductive material and having an outer contact surface exposed through the second longitudinal opening, the fixed contact configured to form a portion of the outer surface of the spout.

According to yet another aspect of the invention, a method of increasing heat dissipation within switchgear uses a spout having an outer surface, a housing, and a fixed contact. The method includes securing the fixed contact with the housing of the spout, the fixed contact having an outer contact surface thriving a portion of the outer surface of the spout, securing a bus bar to the outer contact surface of the fixed contact, and dissipating heat through a radial ventilation opening in the spout, wherein the ventilation opening is unobstructed by the bus bar.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
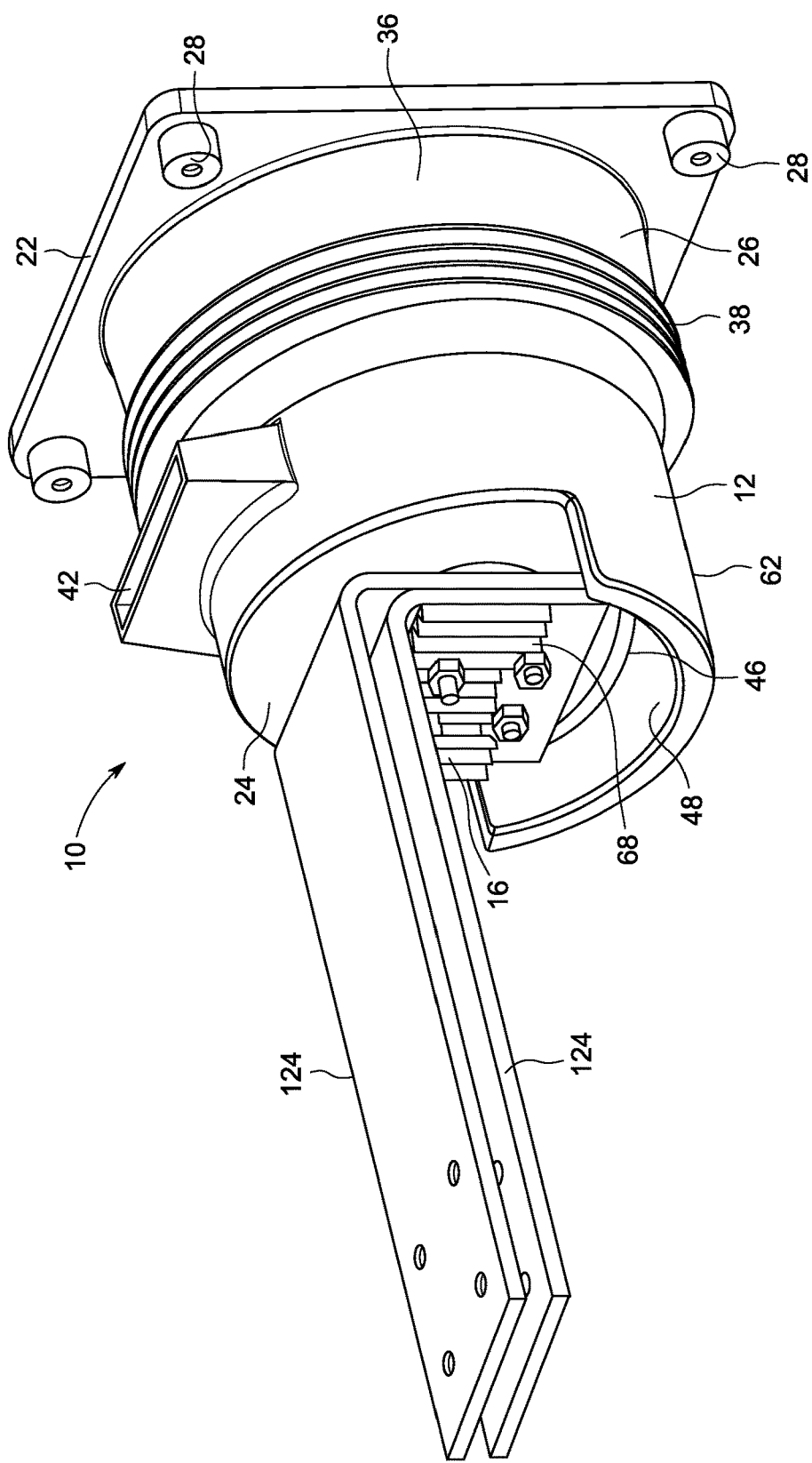
FIG. 1 is a side perspective view of an exemplary embodiment of a spout.
Figure 2:
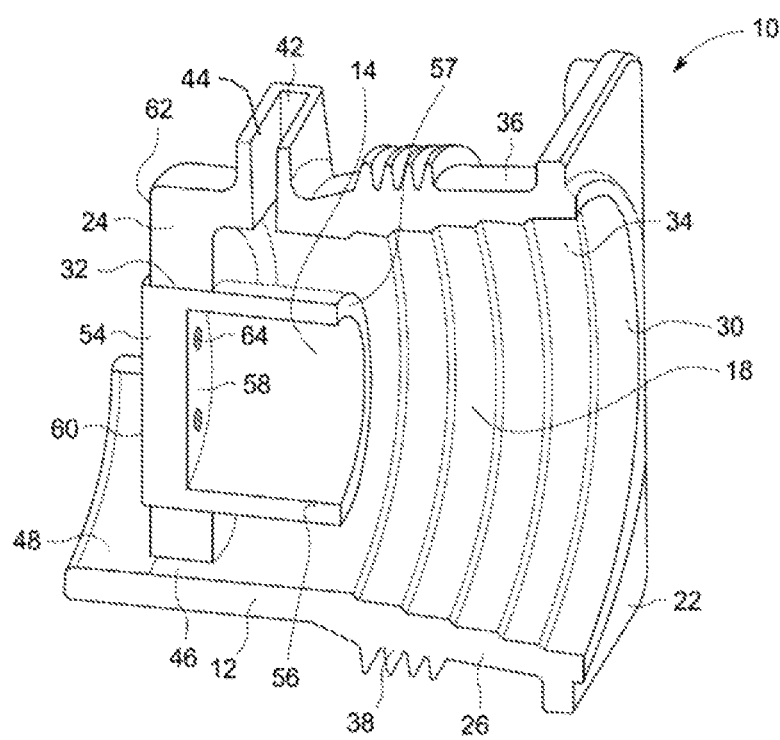
FIG. 2 is a cross-sectional perspective view of an exemplary embodiment of the spout.
Figure 3:
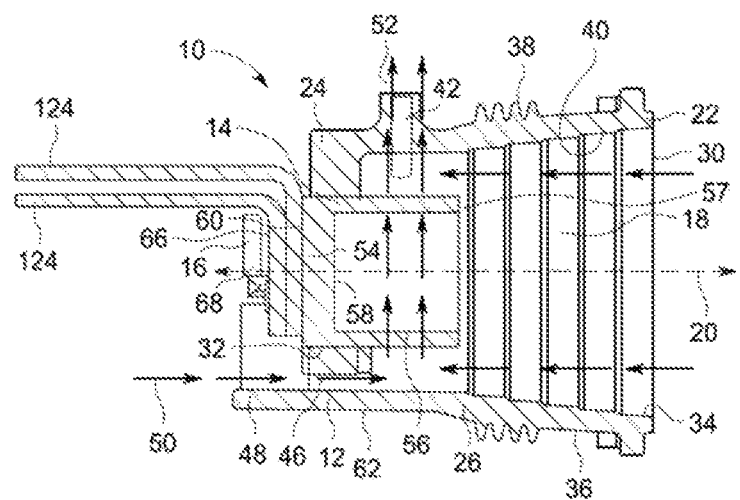
FIG. 3 is a cross-sectional side view of an exemplary embodiment of the spout illustrating a direction of ventilation flow; and, FIG. 4 is a cross-sectional side view of an exemplary embodiment of switchgear incorporating the spout.

With reference to FIGS. 1-3, an exemplary embodiment of a spout 10 is shown to include a housing 12, a fixed contact 14, and a heat sink 16.

The housing 12 is a contactor box made of an insulative material including, but not limited to, epoxy resin. The housing 12 includes an inner cavity 18 therein and a longitudinal axis 20 extending through the inner cavity 18. The housing 12 also includes a base portion 22, a fixed contact receiving portion 24 opposite the base portion 22, and a substantially tubular shaped body 26 which defines the inner cavity 18. The base portion 22, which is illustrated as substantially planar and substantially perpendicular to the longitudinal axis 20, is configured to assist in mounting the spout 10 to a compartment wall 120, 122 of switchgear 100 as will be further described below with respect to FIG. 4. The base portion 22 may further include one or more fastening areas 28. In the illustrated embodiment, the fastening areas 28 include apertures that are provided in the base portion 22 and configured to receive connectors (not shown), such as, but not limited to, screws, bolts, prongs, etc., to connect the spout 10 to the compartment wall 120, 122 of switchgear 100. Alternatively, the fastening areas 28 may include threaded male portions (not shown) that insert into holes of a compartment wall 120, 122 for receiving a threaded bolt thereon. In yet another alternative embodiment, the fastening areas 28 may include a male portion extending beyond the planar portion of the base portion 22 for guiding the spout 10 into an opening of the compartment wall 120, 122. While a particular arrangement is illustrated and alternatives have been described, the spout 10 may include any alternative design for the base portion 22 to accommodate varying designs of switchgear 100. The base portion 22 further includes a first longitudinal opening 30 of the housing 12, the first longitudinal opening 30 arranged to access the inner cavity 18 of the housing 12 from the base portion 22. The fixed contact receiving portion 24 of the housing 12 is located opposite the base portion 22, and may be a wall substantially parallel to the base portion 22. The fixed contact receiving portion 24 includes a second longitudinal opening 32 to receive the fixed contact 14 therein. The inner cavity 18 is located between the fixed contact receiving portion 24 and the base portion 22. That is, the base portion 22 is disposed at a first longitudinal end of the cavity 18, while the fixed contact receiving portion 24 is disposed at a second longitudinal end of the inner cavity 18.

The substantially tubular shaped body 26 of the housing 12 extends from the fixed contact receiving portion 24 to the base portion 22. The body 26 includes an inner surface 34 and an outer surface 36. The outer surface 36 may include a plurality of ridges 38. The inner surface 34 of the body 26 defines the inner cavity 18 of the housing 12 and may include a step type creepage skirt 40 that provides an easy to clean surface and provides for improved insulation. The inner surface 34 of the body 26 adjacent the base portion 22 has a larger inner diameter than an inner diameter of the body 26 adjacent the fixed contact receiving portion 24, such that the inner cavity 18 expands radially outwardly towards the base portion 22. The body 26 includes at least one first ventilation opening 42 that ventilates the inner cavity 18 to an exterior of the spout 10. The first ventilation opening 42 includes a radial opening that extends in a radial direction through the body 26, with respect to the longitudinal axis 20, and is longitudinally disposed between the fixed contact receiving portion 24 and the base portion 22. In the illustrated embodiment, the first ventilation opening 42 is rectangular shaped with a length that extends across the body 26 substantially parallel to the fixed contact receiving portion 24 and the base portion 22, and a width that extends substantially parallel to the longitudinal axis 20. The first ventilation opening 42 may further include a heat dissipation channel 44 extending radially outwardly from the tubular shaped body 26. The heat dissipation channel 44 may include a rectangular cross-sectional shape, or other shape that substantially matches the shape of the radial opening of the first ventilation opening 42. The heat dissipation channel 44 protects the inner cavity 18 from the introduction of foreign particulate matter through the first ventilation opening 42. Via the first ventilation opening 42, the inner cavity 18 of the housing 12 is in fluid communication with the exterior surroundings of the spout 10.

The body 26 further includes a second ventilation opening 46. As shown in FIG. 3, the second ventilation opening 46 provides ventilation from the exterior of the spout 10 into the inner cavity 18. The second ventilation opening 46 is an off-axis opening provided in the fixed contact receiving portion 24. In the illustrated embodiment, the second ventilation opening 46 is formed between the fixed contact receiving portion 24 and the body 26. The body 26 may include a protective lip 48 that extends longitudinally past the fixed contact receiving portion 24. The protective lip 48 protects the inner cavity 18 from the introduction of foreign particulate matter through the second ventilation opening 46. Ventilating air and heat dissipation between the inner cavity 18 and the exterior surroundings of the spout 10 may thus occur through the second ventilation opening 46 in a direction 50 substantially parallel to the longitudinal axis 20, and through the first ventilation opening 42 in a direction 52 substantially perpendicular to the longitudinal axis 20.

The fixed contact 14 of the spout 10 includes a conductive material and is fixedly seated within the second longitudinal opening 32 of the fixed contact receiving portion 24 of the housing 12. In an exemplary embodiment, the fixed contact 14 is molded with the housing 12 so as to be integrally combined therewith. That is, the fixed contact 14 need not be separately installed within the housing 12 by an operator, or installed within the housing 12 such as via screws and nuts or the like by a manufacturer since the fixed contact 14 and housing 12 are manufactured together as an integral unit. The fixed contact 14 includes a fixed contact wall 54, and may further include a tubular extension 56. The fixed contact 54 includes an inner surface 58 and an outer contact surface 60. The inner surface 58 of the fixed contact wall 54 faces the inner cavity 18 of the spout 10. The outer contact surface 60 of the fixed contact wall 54 forms a portion of an outer surface 62 of the spout 10 at a longitudinal end of the inner cavity 18. The fixed contact wall 54 may further include fastening areas 64, such as apertures formed therein, to allow for the connection of a bus bar 124 to the fixed contact 14. The tubular extension 56 of the fixed contact 14 extends from the fixed contact all 54 into the inner cavity 18 of the spout 10. The longitudinal axis 20 of the spout 10 can be shared by the tubular extension 56. The tubular extension 56 provides a guide for a connection 126 of a circuit breaker 108 (FIG. 4) which is axially receivable within the inner cavity 18 via the first longitudinal opening 30 of the housing 12, while the fixed contact wall 54 provides a contact surface for the bus bar 124. The fixed contact receiving portion 24 encircles an outer surface of the fixed contact 14 to retain the fixed contact 14 with the housing 12 while allowing the outer contact surface 60 of the fixed contact wall 54 to remain accessible from an exterior of the spout 10.

The heat sink 16 is a passive heat exchanging component arranged to cool the fixed contact 14 and attached bus bars 124 by dissipating heat into the surrounding environment. The heat sink 16 may be made of any heat sink material including, but not limited to, aluminum alloy. The heat sink 16 may further include a base 66 and an arrangement of protrusions 68, such as fins or pins, extending from the base 66 to increase the surface area of the heat sink 16. The heat sink 16 is connectable to the outer contact surface 60 of the fixed contact wall 54 of the fixed contact 14. The heat sink 16 may be selectively utilized in applications where controlling excessive heat is critical to the successful operation of switchgear 100. The heat sink 16 includes a block of material connectable to the outer contact surface 60 via one or more attachment devices 70, such as screws, bolts, rods, and the like, that extend through aligned apertures in the heat sink 16 and fastening areas 64 in the fixed contact wall 54. Because the heat sink 16 is easily attachable to the outer surface 62 of the spout 10, different heat sinks 16 with varying capabilities, shapes, and materials can be readily exchanged to address the expected conditions within the switchgear 100. In use, the bus bar 124 is connected between the heat sink 16 and the outer contact surface 60 of the fixed contact wall 54 of the fixed contact 14. The bus bar 124 includes apertures that align with the apertures of the heat sink 16 and fastening areas 64 the fixed contact 14 for easy securement thereto.

Figure 4:
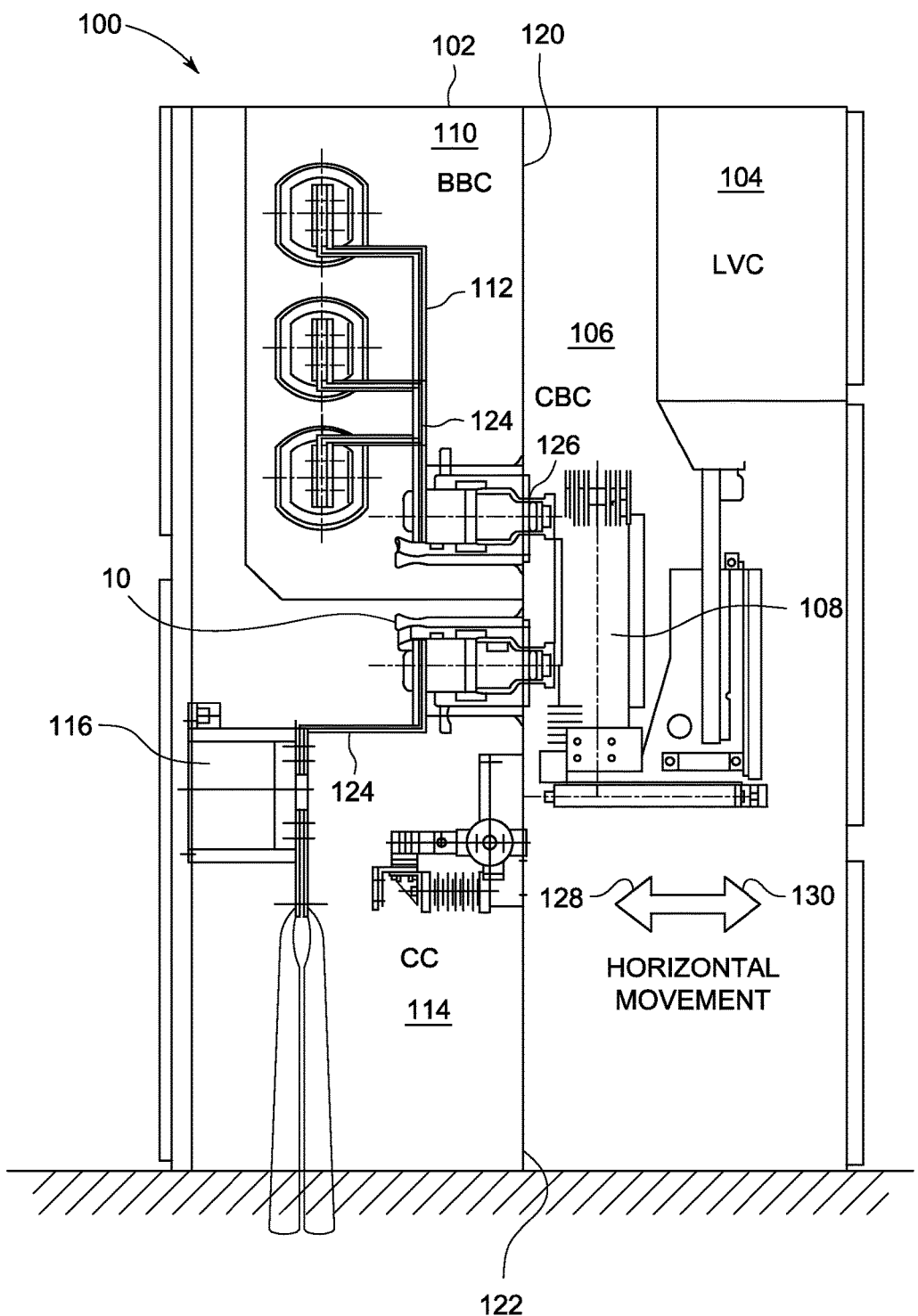

The above-described spout 10 is suited for use in switchgear. An exemplary embodiment of switchgear 100 is shown in FIG. 4. The illustrated, switchgear 100 includes an enclosure 102 divided into compartments, including a low voltage compartment ("LVC") 104, a circuit breaker compartment ("CBC") 106 housing one or more circuit breakers 108, a bus bar compartment ("BBC") housing a bus bar system 112, and a cable connection compartment ("CC") 114 housing a current transformer 116. A spout 10 is mounted onto a compartment wall 120 of the switchgear 100 that separates the circuit breaker compartment 106 from the bus bar compartment 110 and another spout 10 is mounted onto a compartment wall 122 of the switchgear 100 that separates the circuit breaker compartment 106 from the cable connection compartment 114. It should be understood that while only two spouts 10 are illustrated, the switchgear 100 could utilize any number of spouts 10 to accommodate varying numbers of circuit breakers 108. One or more bus bars 124 are attached to the exterior of the spout 10 via the outer contact surface 60 of the fixed contact 14. Thus, the bus bar 124 does not block the first ventilation opening 42 and greater heat dissipation is allowed from the inner cavity 18. The circuit breaker 108 is electrically connected to the bus bar system 112 via the spout 10 by plugging a connection 126 of the circuit breaker 108 onto the fixed contact 14 which is electrically connected to the bus bar system 112 via the bus bar 124. The circuit breaker 108 is movable in the direction of arrows 128, 130 to plug and unplug the connections 126 of the circuit breaker 108 within the spout 10, such as by overlapping the connection 126 over the tubular extension 56 to make electrical contact. The bus bar 124 makes electrical contact with the fixed contact 14, thus providing electrical contact between the circuit breaker connection 126 and the bus bar system 112 when the circuit breaker 108 is plugged therein.

Large amounts of heat are generated due to the currents flowing in the switchgear 100, which may lead to overheating. The spout 10 described herein, however, combines several features that solve the challenges of a temperature rise test, which is a test undertaken to determine the temperature rise of one or more pans of the switchgear 100 under a specified operating condition. Because the fixed contact 14 of the spout 10 is integrally formed with the housing 12 and due to the outer contact surface 60 enabling a connection to the bus bar 124 exterior to the spout 10, the spout 10 has fewer key assembly points within the spout 10 than a spout with a fixed contact bolted within an interior of the spout which connects the bus bar to the fixed contact within an interior of the spout (not shown). That is, the only heat producing assembly point within the spout 10 is the connection point at the rim 57 of the tubular extension 56 when connected to the connection 126 of the circuit breaker 108. A conventional spout, however, will in addition to having a heat producing connection point at a connection 126, will have heat producing assembly points within the spout at locations where the bus bar is connected to a fixed contact within the spout. Due to the reduced number of key assembly points within spout 10, less heat is produced within spout 10 which reduces the requirement for cooling. Cooling of the bus bar 124 is improved in the spout 10 by arranging the connection of the bus bar 124 to the fixed contact 14 to the outer surface 62 of the spout 10. Furthermore, because the first ventilation opening 42 is not blocked by the bus bar 124, heat dissipation from within the inner cavity 18 of the spout 10 is increased. The addition of the second ventilation opening 46 also increases ventilation efficiency. The spout 10 may also be termed a ventilation spout due to the increased ventilation efficiency. The spout 10 is further designed to accommodate the heat sink 16 outside of the spout 10, which further increases the overall heat dissipating effect. The step type creepage skirt 40 is easier to clean and provides insulation. Additionally, the integrated spout 10 with fixed contact 14 simplifies the overall structure of the spout 10 to provide better electrical performance. Less copper for bus bar 124 may be required due to the exterior connection, and a cost savings can be realized by using the spout 10 with the switchgear 100.

While the invention has been described in detail in connection with a limited number of embodiments, it should be readily understood that an embodiment of the present invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, an embodiment of the present invention is not to be seen as limited by the foregoing description, but is only limited by the scope of the appended claims.

What is claimed is:

1. A spout for a connection between a bus bar and a circuit breaker in a switchgear, the spout having an outer surface and comprising:
   a housing formed of insulative material, including:
      a tubular body having an inner cavity, a radial first ventilation opening, and a second ventilation opening;
      a base portion having a first longitudinal opening therethrough, the first longitudinal opening opposing the second ventilation opening; and
      a fixed contact receiving portion, having a second longitudinal opening, wherein the second ventilation opening is formed between the fixed contact receiving portion and the tubular body, and provides ventilation from an exterior of the spout into the inner cavity; and
   a fixed contact formed of an electrically conductive material and having an outer contact surface exposed through the second longitudinal opening, the fixed contact forming a portion of the outer surface of the spout, wherein the tubular body includes a lip extending longitudinally past the outer contact surface of the fixed contact and at least partially surrounding the second ventilation opening.

2. The spout of claim 1, wherein the first ventilation opening includes a heat dissipation channel extending radially outwardly from the tubular body.

3. The spout of claim 1, wherein the first ventilation opening is unblocked by the bus bar for heat dissipation from the inner cavity.

4. The spout of claim 1, wherein the fixed contact includes a tubular extension within the inner cavity and a fixed contact wall having the outer contact surface.

5. The spout of claim 1, wherein the housing is integrally molded to the fixed contact.

6. The spout of claim 1, wherein the tubular body includes a step type creepage skirt.

7. The spout of claim 1, wherein the second ventilation opening is an off-axis opening through the fixed contact receiving portion.

8. The spout of claim 1, wherein the second ventilation opening is disposed at a longitudinally opposite end of the spout from the first longitudinal opening.

9. The spout of claim 1, wherein the fixed contact receiving portion is located opposite the base portion.

10. The spout of claim 1, wherein the first longitudinal opening is arranged to access the inner cavity of the housing from the base portion.

11. The spout of claim 1, wherein the fixed contact receiving portion is located opposite the base portion.

12. The spout of claim 11, wherein the fixed contact receiving portion is a wall substantially parallel to the base portion.

13. The spout of claim 1, wherein the second longitudinal opening is sized and disposed to operatively receive the fixed contact therein.

14. The spout of claim 1, wherein the inner cavity is located between the fixed contact receiving portion and the base portion.

15. The spout of claim 1, wherein the base portion is disposed at a first longitudinal end of the inner cavity, and the fixed contact receiving portion is disposed at a second longitudinal end of the inner cavity.

16. A spout for a connection between a bus bar and a circuit breaker in a switchgear, the spout having an outer surface and comprising:
a housing formed of insulative material, including:
a tubular body, having an inner cavity, a radial first ventilation opening, and a second ventilation opening;
a base portion having a first longitudinal opening therethrough, the first longitudinal opening opposing the second ventilation opening; and
a fixed contact receiving portion, having a second longitudinal opening, wherein the second ventilation opening is formed between the fixed contact receiving portion and the tubular body, and provides ventilation from an exterior of the spout into the inner cavity; and
a fixed contact formed of an electrically conductive material and having an outer contact surface exposed through the second longitudinal opening, the fixed contact forming a portion of the outer surface of the spout, wherein the second ventilation opening is an off-axis opening through the fixed contact receiving portion.

17. The spout of claim 16, wherein the first ventilation opening includes a heat dissipation channel extending radially outwardly from the tubular body.

18. The spout of claim 16, wherein the first ventilation opening is unblocked by the bus bar for heat dissipation from the inner cavity.

19. The spout of claim 16, wherein the tubular body includes a lip extending longitudinally past the outer contact surface of the fixed contact and at least partially surrounding the second ventilation opening.

20. The spout of claim 16, wherein the fixed contact includes a tubular extension within the inner cavity and a fixed contact wall having the outer contact surface.

21. The spout of claim 16, wherein the housing is integrally molded to the fixed contact.

22. The spout of claim 16, wherein the tubular body includes a step type creepage skirt.

23. The spout of claim 16, wherein the second ventilation opening is disposed at a longitudinally opposite end of the spout from the first longitudinal opening.

24. The spout of claim 16, wherein the first longitudinal opening is arranged to access the inner cavity of the housing from the base portion.

25. The spout of claim 16, wherein the fixed contact receiving portion is located opposite the base portion.

26. The spout of claim 25, wherein the fixed contact receiving portion is a wall substantially parallel to the base portion.

27. The spout of claim 16, wherein the second longitudinal opening is sized and disposed to operatively receive the fixed contact therein.

28. The spout of claim 16, wherein the inner cavity is located between the fixed contact receiving portion and the base portion.

29. The spout of claim 16, wherein the base portion is disposed at a first longitudinal end of the inner cavity, and the fixed contact receiving portion is disposed at a second longitudinal end of the inner cavity.

* * * * *